B. HICKS.
FERTILIZER DISTRIBUTER.
APPLICATION FILED OCT. 9, 1919.
1,332,125. Patented Feb. 24, 1920.
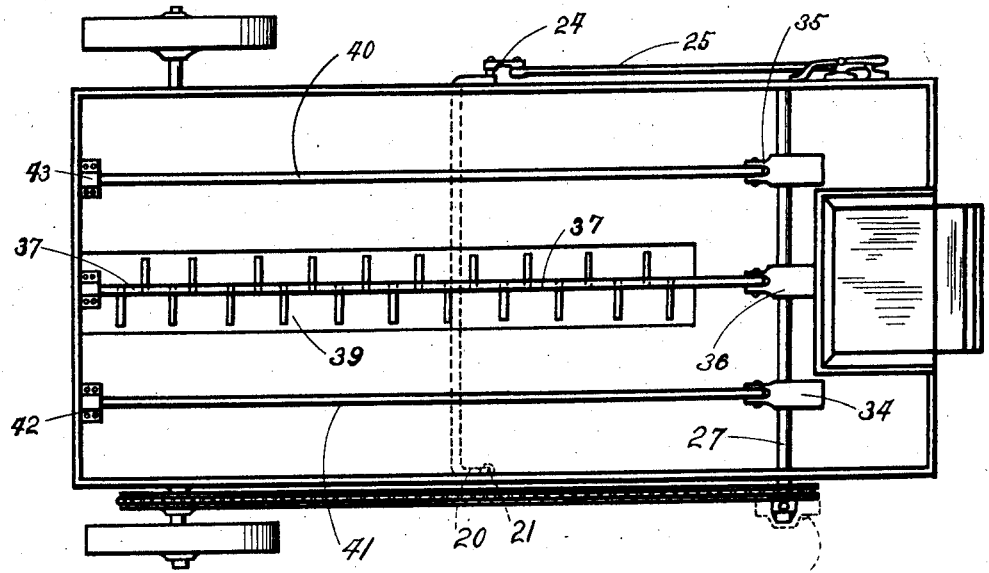
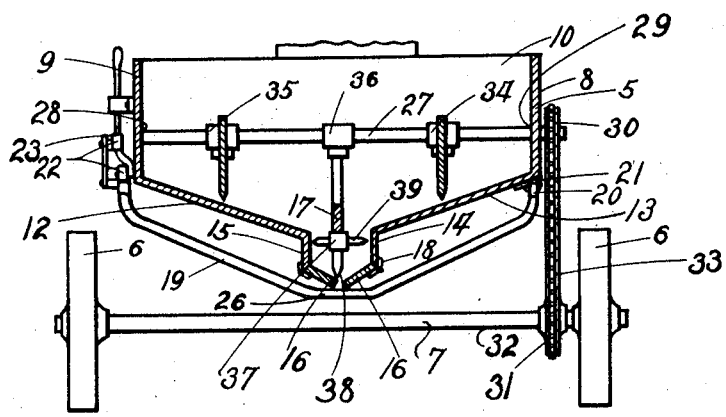
Inventor
Benjamin Hicks
Witness
By C. A. Snow & Co.
Attorneys

UNITED STATES PATENT OFFICE.

BENJAMIN HICKS, OF SEDLEY, VIRGINIA.

FERTILIZER-DISTRIBUTER.

1,332,125.　　　Specification of Letters Patent.　　Patented Feb. 24, 1920.

Application filed October 9, 1919. Serial No. 329,588.

*To all whom it may concern:*

Be it known that I, BENJAMIN HICKS, a citizen of the United States, residing at Sedley, in the county of Southampton and State of Virginia, have invented a new and useful Fertilizer-Distributer, of which the following is a specification.

This invention relates to improvements in agricultural machinery, and more particularly to devices known as fertilizer distributers.

The important feature of the present invention is to provide a fertilizer distributer, especially constructed for drilling fertilizer, and one which will cause a constant and even agitation of the fertilizing material held within the body of the machine, thereby insuring against the fertilizing material, sticking, or clogging within the machine.

A further object of the invention is to provide efficient mechanism including eccentrics for operating the movable elements within the body of the machine, thereby eliminating the use of the chains or sprocket wheels ordinarily employed in connection with machines of this character, and which clog, or otherwise render the machine inoperative.

A further object of the invention is to provide a machine of this character having a body provided with a central trough, which trough directs the distribution of the fertilizing material in predetermined quantities, thereby insuring the fertilizing material being distributed throughout the length of a furrow.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:—

Figure 1 illustrates a top plan view of a fertilizer distributer constructed in accordance with the present invention.

Fig. 2 illustrates a transverse sectional view taken on line 2—2 of Fig. 1.

Having reference to the drawings in detail, the reference character 5 designates the body of the fertilizer distributer, which body is supported by the usual wheels 6, operating on the supporting axles 7.

The body of the machine includes the side members 8 and 9 and end members 10 and 11, which end members are constructed to conform to the general outline of the body portion, to prevent material contained therein, from finding its way out of the body, at the ends thereof.

The bottom of the fertilizer distributer, or body portion thereof includes the angularly disposed sections 12 and 13, each of said sections having connection with the side members, 8 and 9, by suitable means, not shown, the lower ends of said sections 12 and 13 having connection with the vertically extending members 14 and 15, which are disposed in spaced relation to form the side walls of a trough, which extends longitudinally of the body, substantially the entire length thereof.

This trough is provided with hinged bottom sections 16 and 17, the same being connected to the members 14 and 15, by suitable hinge members 18, and as shown, the free ends of the bottom sections 16 and 17 lie in close engagement with each other, forming a substantially V-shaped bottom, when the same are in their closed positions.

An angular closing bar 19, has its end 20 pivotally connected to the central portion of the body, by means of the bracket member 21, disposed under the body, adjacent one side edge thereof, which bracket is designed to rigidly, but movably support one end of the closing bar 19, the opposite end of said bar 19, being pivotally connected to the body as at 22, the same having connection with the operating lever 23, through the medium of the links 24 and the relatively long connecting rod 25.

This closing bar 19, is provided with a central horizontal portion 26, adapted to engage the bottom sections 16 and 17, for supporting the weight of the material held in the trough, and it will thus be seen that when the closing bar 19, is lowered by rocking the operating lever 23, rearwardly, the angled portions of the bar permit the horizontal portion of the bar to move downwardly, allowing the sections 16 and 17, to open a predetermined distance, whereupon the weight of the material in the body causes the sections 16 and 17 to hinge downwardly, to discharge material throughout the length of the body. It is therefore obvious that the hinged sections 16 and 17 may be moved to assume a vertical position, thereby, affording efficient means for permitting the contents of the body of the fertilizer distributer to be dumped therefrom in the event that a quantity of fertilizing material remains in the machine, after a sufficient quantity has been distributed over the field, undergoing the fertilizing treatment. From the foregoing, it is obvious that movement of the bar 19 causes a relative movement of the sections 16 and 17, thereby regulating the amount of discharge of material.

Disposed adjacent the forward portion of the fertilizer distributer, is a horizontally disposed power shaft 27, the same being supported in spaced relation with the bottom of the fertilizer distributer, by means of the bearings 28 and 29, formed in the side members 8 and 9, of the body portion thereof, and as shown, one end of the power shaft 27 extends beyond the vertical plane of the side member 8, and accommodates the sprocket wheel 30, which has connection with the sprocket wheel 31, keyed, or otherwise secured to the shaft 32, by means of the sprocket chain 33.

The power shaft 27, is provided with the lateral eccentrics 34 and 35, and a central eccentric 36, the central eccentric 36 having connection with one end of the central agitating bar 37.

This agitating bar 37, extends substantially the entire length of the trough formed in the bottom of the body, and includes a relatively long section 17, the same being provided with a plurality of laterally extending agitators 39, disposed in spaced relation throughout the entire length of the agitator bar 37, and a plurality of vertically disposed agitators 38, depending from the under side thereof.

The bars 40 and 41, which also have connection with the power shaft 27, through the medium of eccentrics 34 and 35, have their rear ends operating in the brackets 42 and 43, which brackets are disposed adjacent the end of the body, and it will be seen that movement of the power shaft 27, causes a relative movement of the agitating bar 37 and the reciprocating bars 40 and 41, these bars, which are disposed adjacent the upper ends of the bottom members 12 and 13, loosen the material to prevent the same from clogging, and cause the same to gradually move toward the trough, disposed adjacent the lower ends of the inclined bottom sections 12 and 13, whereupon the agitators 39 and 38 engage the same and force the material out of the bottom of the trough, between the sections 16 and 17, discharging material throughout the entire length of the open bottom of the trough.

It might be further stated that suitable clutch mechanism operated by the clutch lever 44, causes the power shaft 27 to be brought into and out of operation, by manipulating the lever at the will of the operator.

Having thus described the invention, what is claimed is:—

1. In a fertilizer distributer, a body having an inclined bottom, a trough forming the central portion of the bottom, reciprocating members operating within the body, a central agitating member operating in the trough, means for operating the reciprocating members and agitating member, and means for throwing the agitating member and reciprocating members into and out of operation.

2. In a fertilizer distributer, a body including an inclined bottom, a trough formed longitudinally of, and centrally of the bottom, said trough having hinged bottom sections, an agitating bar operating in the trough, means for operating the agitating bar, means for opening and closing the hinged bottom sections of the trough for regulating the amount of material allowed to pass through.

3. In a fertilizer distributer, a body including inclined bottom sections, a trough formed adjacent the lower ends of the inclined bottom sections, an agitating bar operating in the trough, means for operating the agitating bar, and means operated by the means for operating the agitating bar, for causing material supported in the body of the fertilizer distributer to move toward the trough.

4. In a fertilizer distributer, a body including inclined bottom sections, a trough formed adjacent the lower ends of the sections, said trough having hinged bottom members, an agitating bar operating in the trough, said bar including a relatively long member and laterally extending members having connection therewith, also vertically extending members on the under side thereof, the laterally extending members operating in close proximity to the sides of the trough, and the vertically extending members operating in close proximity to the hinged bottom sections and in the space between the hinged bottom sections when the agitating bar is in its lowest position on the eccentric.

In testimony that I claim the foregoing as my own, I have hereto affixed my signature in the presence of two witnesses.

BENJAMIN HICKS.

Witnesses:
 BESSIE M. WILLS,
 CHAS. W. DAVIS.